United States Patent [19]
Palm

[11] Patent Number: 5,699,444
[45] Date of Patent: Dec. 16, 1997

[54] METHODS AND APPARATUS FOR USING IMAGE DATA TO DETERMINE CAMERA LOCATION AND ORIENTATION

[75] Inventor: Charles S. Palm, Westlake Village, Calif.

[73] Assignee: Synthonics Incorporated, Westlake Village, Calif.

[21] Appl. No.: 414,651

[22] Filed: Mar. 31, 1995

[51] Int. Cl.$^6$ .................................................. G01C 3/00
[52] U.S. Cl. ........................... 382/106; 382/154; 348/42; 348/47; 356/3
[58] Field of Search ................................ 382/106, 154, 382/285; 348/42, 47, 48, 50, 139; 356/3

[56] References Cited

U.S. PATENT DOCUMENTS

| | | | |
|---|---|---|---|
| 4,965,840 | 10/1990 | Subbarao | 382/106 |
| 4,969,106 | 11/1990 | Vogel et al. | 382/108 |
| 5,146,346 | 9/1992 | Knoll | 358/298 |
| 5,259,037 | 11/1993 | Plunk | 382/291 |
| 5,525,883 | 6/1996 | Avitzour | 364/424.02 |

OTHER PUBLICATIONS

Wolfgang Boehm et al., Geometric Concepts for Geometric Design, 1994, Chapter 8: Reconstruction, pp. 71–76.
David F. Rogers et al., Mathematical Elements for Computer Graphics, Second Edition, 1990, pp. 200–207.
Manual of Photogrammetry, Fourth Edition, 1980, American Society of Photogrammetry, pp. 54–57.

Primary Examiner—Leo Boudreau
Assistant Examiner—Chris Kelley
Attorney, Agent, or Firm—Lowe, Price, LeBlanc & Becker

[57] ABSTRACT

Methods and apparatus for accurately surveying and determining the physical location of objects in a scene are disclosed which use image data captured by one or more cameras and three points from the scene which may either be measured after the images are captured or may be included in the calibrated target placed in the scene at the time of image capture. Objects are located with respect to a three dimensional coordinate system defined with reference to the three points. The methods and apparatus permit rapid set up and capture of precise location data using simple apparatus and simple image processing. The precise location and orientation of the camera utilized to capture each scene is determined from image data, from the three point locations and from optical parameters of the camera.

19 Claims, 13 Drawing Sheets

METHODS AND APPARATUS FOR USING IMAGE DATA TO DETERMINE CAMERA LOCATION AND ORIENTATION

TECHNICAL FIELD

The invention relates to the field of image processing and more particularly to methods and apparatus for determining camera position and orientation from an image captured with that camera and to accurate surveying using such methods and apparatus.

BACKGROUND ART

Since the invention of the stereoscope in 1847, inventors have attempted to replicate three dimensional (3D) images found in nature. Two dimensional images lack realism due to the absence of depth queues. Many techniques have been devised for producing 3D images with varying degrees of success.

Stereoscopic photographic cameras are known which utilize a single camera body and two objective lenses separated by a fixed distance, usually corresponding to the interocular distance. Other such cameras use a single objective and external arrangements which form two image areas on film positioned on the camera's image plane. Still other arrangements use two separate cameras separated by a fixed distance to form images corresponding to a left and right eye view of the scene being photographed.

Once stereoscopic photographic images of the prior art are developed, they are often viewed through separate eye pieces, one for each eye. Each eye piece projects a view of a respective one of the developed images which the user's eyes would have seen had the eyes viewed the scene directly. Depth is clearly discernable when viewing a stereoscopic image.

There are several problems with prior art techniques for generating three dimensional images. First, the requirement that there be a fixed camera to camera or objective to objective separation limits flexibility in the construction of cameras. The requirement for two objective lenses or two cameras dictates special apparatus in order to capture stereoscopic images.

Another problem with the prior art is that complicated lens arrangements are necessary to view stereoscopic images. Further, in the stereoscopic photographic systems of the prior art, depth was not readily quantifiable.

Calculations of depth is a difficult task when using images captured from different positions vis-a-vis the scene being photographed because the planar relationships which result from projection of a three dimensional scene onto a two dimensional plane do not undergo a linear transformation or mapping compared with the same points projected onto a different image plane. Different portions of a scene viewed from one point relate differently to corresponding points from the same scene viewed from another point. As one changes viewing positions, some portions of a scene become hidden as the view point changes. Planar surfaces which are viewed normally in one view are reduced in extent when viewed obliquely.

In the prior art, methods and apparatus are known for surveying a plot of land to identify the locations of significant features of the plot. Typically, this involves a team of surveyors who go to the plot and make physical measurements of distance and angle using a surveyor's transit theodolite and calibrated standards for measuring distance. Surveys using these techniques are typically baselined against a national grid of survey markers. This technique is subject to errors of various kinds in reading the instruments and in performing calculations.

Aerial surveying is also known. Images are captured from an airplane or other vehicle in transit over an area to be surveyed at positions which are precisely known by modern navigation techniques. Position of significant ground features can then be calculated using sophisticated image processing techniques which often require supercomputers. Aerial surveying techniques have the advantage that they can be accomplished without the need to place people on the ground in the area to be surveyed. Inaccessible terrain can also be surveyed in this way. However, expensive image capture equipment is required and even with very good optics and image processing, the resolution is not always as good as one might like. Also, accurate measurements in the vertical direction are even more difficult to take using aerial techniques.

In forensic investigations such as those of a crime scene or archeological dig, spatial relationships are very important. Such investigations often occur under conditions where some urgency or public necessity exists to vacate the scene of the investigation in a short period of time. If a freeway is blocked for an investigation during rush hour, the need to resume traffic flow is a political necessity. In crime scene analysis, if details are not observed and recorded immediately, valuable evidence may be lost. In such circumstances, there is not time for a careful manual survey and aerial techniques generally lack needed resolution or are too expensive for general application to police investigations.

In a manufacturing environment, it is often desirable to determine the physical details of a product "as built" either for inspection purposes or for documentation with substantial accuracy.

In manufacturing, it is often desirable to capture the physical dimensions of complex objects for purposes of creating a three dimensional (3-D) representation, such as a wireframe, for use in computer assisted design or computer assisted manufacturing (CAD/CAM). In entertainment, it is desirable to use such a 3-D representation for creating animations which result in changes to the position or viewing perspective of a 3-D object.

There is thus a need to accurately capture 3-D information about objects and scenes in ways which are convenient and economical and which don't require sophisticated computing equipment. There is also a need to accurately capture physical dimensions of objects in the vertical direction which might be inaccessible to a physical survey.

Every recorded image, whether it be a photograph, a video frame, a true perspective drawing or other form of recorded image, has associated with it a viewing location and viewing look angles that exactly describe the orientation of the recording mechanism relative to the recorded scene.

When making distance calculations from images captured using cameras, it is necessary to know the location of the camera at the time the picture was taken, or more precisely the front principal point of the camera lens or system of lenses at the time the picture was taken. To calculate distances accurately, it is also desirable to know the azimuth, elevation and rotation angle of the optical axis of the lens or lens system as it emerges from the camera.

In the prior art, camera location was either estimated or known a priori by locating the position from which the picture was taken using surveying techniques. Typically, rotation angle was assumed to be 0 (horizontal) and elevation and azimuth were either measured with varying degrees of accuracy or estimated. Clearly, such surveying and measurement increase the set up time required before capturing images for analysis, often to the point where any hope of accurate measurements would be abandoned in favor of qualitative information which could be gleaned from images captured under uncontrolled conditions.

The need for accurate viewing parameters is being expressed by an ever increasing population of computer users who use digital and analog images for a wide range of purposes, from engineering measurement applications to marketing and sales presentations.

For example, stereo photographs are frequently used to investigate and document accident or crime scenes. The accuracy of the documentation depends to a high degree on knowing exactly the viewing parameters of the cameras at the time the photographs were taken.

Computer-generated renderings are often merged with actual photographs to convey an image of a completed construction project while still in the planning and review stages. In order to make the computer rendering blend into and match the photograph in a visually convincing manner, it is necessary for the viewing parameters of the computer rendering to be exactly the same as the viewing parameters of the camera that took the photograph.

Typically, the viewing parameters for any given recorded image are unknown and difficult to determine with a high degree of accuracy, even when the camera positions are physically measured relative to some established coordinate system. The difficulties arise from the fact that the camera lens principle points are usually located inside the lens structure and therefore inaccessible for purposes of direct measurement. The measurement of viewing angles is even more difficult to accomplish without the use of surveying type tripods, levels and transits.

Photogrammetry is a science that deals with measurements made from photographs. Generally, photogrammetrists use special camera equipment that generates fiducial marks on the photographs to assist in determining the viewing parameters. Non-photogrammetric cameras can be used in some analyses, however the associated techniques generally require knowing the locations of a large number of calibration points (five or more) that are identifiable in the recorded scene. Generally, the three-dimensional location of five or more calibration points need to be known in terms of some orthogonal, reference coordinate system, in order to determine the viewing parameters. The Direct Linear Transform (DLT) is a five-point calibration procedure that is sometimes employed by photogrammitrists. It is usually difficult and expensive to establish the locations of these points and it is certainly complicated enough to deter a non-technical person from attempting to determine the viewing parameters. Unless a tightly controlled calibration coordinates system is established prior to taking the photographs, it is necessary for the user to know a minimum of nine linear dimensions between the five points. This requirement limits the use of the technique considerably.

In some specialized cases, such as certain aerial surveying applications, conventional photogrammetry can be employed to determine camera parameters using as few as three calibration points. In particular, the Church resection model may be used when the optical axis of an aerial camera lens is within four or five degrees of looking vertically down on the terrain. Angular displacements from the vertical of more than a few degrees results in noticeable mathematical nonlinearities that are associated with transcendental trigonometric functions. Under these conditions, the Church resection model is no longer valid and the three-point calibration procedure no longer applies.

All of the calibration techniques discussed above suffer from a number of disadvantages:

(a) They required calibrated camera equipment;

(b) They require calibration targets consisting of too many points to make the procedures practical for common everyday use by non-professionals;

(c) Techniques which use a three-point calibration target are valid only over a very limited range of off normal camera look angles; and (d) All of the previous methods for solving viewing parameters employ matrix operations operating on all point data at the same time, thus allowing one poorly defined measurement parameter to inject errors in a relatively unknown and indeterminable sense due to parameter cross-talk effects.

SUMMARY OF THE INVENTION

The problems of the prior art are overcome in accordance with the invention by automatically identifying camera location and orientation based on image content. This can be done either by placing a calibrated target within the field of the camera or by measuring the distances among three relatively permanent points in the scene of images previously captured. Using the points, the location and orientation of a camera at the time a picture was take can be precisely identified for each picture. Once the location and orientation of the camera are known precisely for each of two or more pictures, accurate 3-D positional information can be calculated for all other identifiable points on the images, thus permitting an accurate survey of the scene or object. The images can be captured by a single camera and then used to generate stereo images or stereo wireframes.

Accordingly, besides the advantages of the simple three-point calibration target described above, several additional objects and advantages of the present invention are:

(a) to provide a decoupling of error terms such that Azimuth, Elevation and Tilt terms do not affect the accuracy of X, Y, and Z terms;

(b) to provide simple procedures that can be applied successfully by non-technical personnel;

(c) to provide an iterative solution such that all viewing parameters are determined to an accuracy in excess of 12 decimal places or the limitations of pixellation error, whichever is larger;

(d) to provide a test of all possible solutions prior to selecting the solution with the least error, and (e) to provide a surveying system which permits capture of 3-D information at large angles off normal.

The above and other objects and advantages of the invention are achieved by providing a method of measuring the absolute three dimensional location of points, such as point D of FIG. 1 with respect to a coordinate system defined using three points, A, B and C, separated by known distances using image data. The image data is captured by using one or more cameras of known focal length to capture two images of a scene containing the points A, B, C and D. The location and orientation of the camera(s) at the time each of said images was captured is determined with reference to said coordinate system by using information derived from said images, the known focal length and the known distances. The locations of the cameras at the time the images were captured is then utilized with other image data, to determine the location of points such as point D.

The step of using the locations of the cameras at the time the images were captured to determine the location of said point D from image data includes defining an auxiliary coordinate system with origin along the line joining the locations of the cameras, defining the center point of each image as an origin of a set of image reference axes pointing in X', Y' and Z' directions, respectively, measuring offset in at least one of the X' and Y' directions of a point on the first image and of a corresponding point of a second image, determining the angles formed between a line joining point D, the focal point of the objective and the image of point D on one of the X' or Y' planes for each of the images, determining said distance h using the measured offsets, the focal length and the angles, determining the X' and Y' coordinates of point D in the auxiliary coordinate system, and transforming coordinates (X', Y', h) of the auxiliary coordinate system to a representation in said coordinate system defined using said three points, A, B and C.

The step of determining the location and orientation of said one or more cameras at the time said images were captured with reference to said coordinate system using image data, known focal length and said known distances includes representing the distance between point A, B and C and the focal point of a camera O as a viewing pyramid, modifying the representation of the pyramid to a joined three triangle flattened representation, selecting a low estimate $Ob^1$ for one interior side of a first triangle of said flattened representation, solving the first triangle using image data, known focal length and said known distances, yielding, inter alia, a first calculated value for length OA, given estimate $Ob^1$, solving the second triangle using results obtained, solving the third triangle using results obtained, yielding, inter alia, a second calculated value for length OA. Subtracting the second calculated value for length OA from the first calculated value for length OA to produce a difference value, revising the value of estimate $Ob^1$ by adding said difference value to achieve a revised estimate, iterating using the revised estimate until said difference value is less than a desired accuracy, and deriving values for camera location using distances OA, OB and OC.

The process of deriving values for camera location using distances OA, OB and OC comprises solving simultaneously equations for spheres centered at points A, B and C with respective radii of OA, OB and OC.

When one determines the orientation of one of more of the cameras, one calculates the azimuthal and elevational adjustment required to direct the camera to the location of point A and calculates the amount of rotation about the optical axis required to align point B once the camera points at point A. This is done interactively until the degree of alignment is within the desired degree of accuracy.

The invention can be used to measure the distance between two points especially in a vertical direction, to locate the physical position of objects visible in images accurately, to create a three dimensional wireframe representation and to document the "as built" condition of an object.

The invention is also directed to a method of measuring the absolute three dimensional location O of a camera with respect to a coordinate system defined using three points, A, B and C, separated by known distances using image data by capturing an image of a scene containing the points A, B, and C, using a camera, determining or knowing a priori the focal length of said camera, determining the location of said camera at the time said image was captured with reference to said coordinate system using information derived from said image, known focal length and said known distances.

The invention is also directed to a method of measuring distance including vertical height by measuring the absolute three dimensional location of points D, E and F with respect to a coordinate system defined using three points, A, B and C, separated by known distances using image data using techniques described above, by determining distances between points D, E and F, and by using the location of said points D, E and F and the location of cameras at the time images were captured to determine the location of other points. The other points may be optionally located on images different from those used to determine the location of points D, E and F.

The invention is also directed to apparatus for measuring the absolute three dimensional location of a point D with respect to a coordinate system defined using three points, A, B and C, separated by known distances using image data including one or more cameras for capturing images of a scene containing the points A, B, C and D, a memory interfaced to the camera(s) for storing images captured by the camera(s), a computer for processing stored images to determine the location and orientation of the camera(s) at the time each of said images was captured with reference to said coordinate system, using information derived from said images, known focal length and said known distances, and for using the locations of said one or more cameras at the time the images were captured to determine the location of said point D from image data. Location information can be stored in a database which can be used for different purposes. For example, it can be used to store a three dimensional wireframe representation or the locations of points surveyed.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DISCLOSURE OF THE INVENTION

Figure 1:
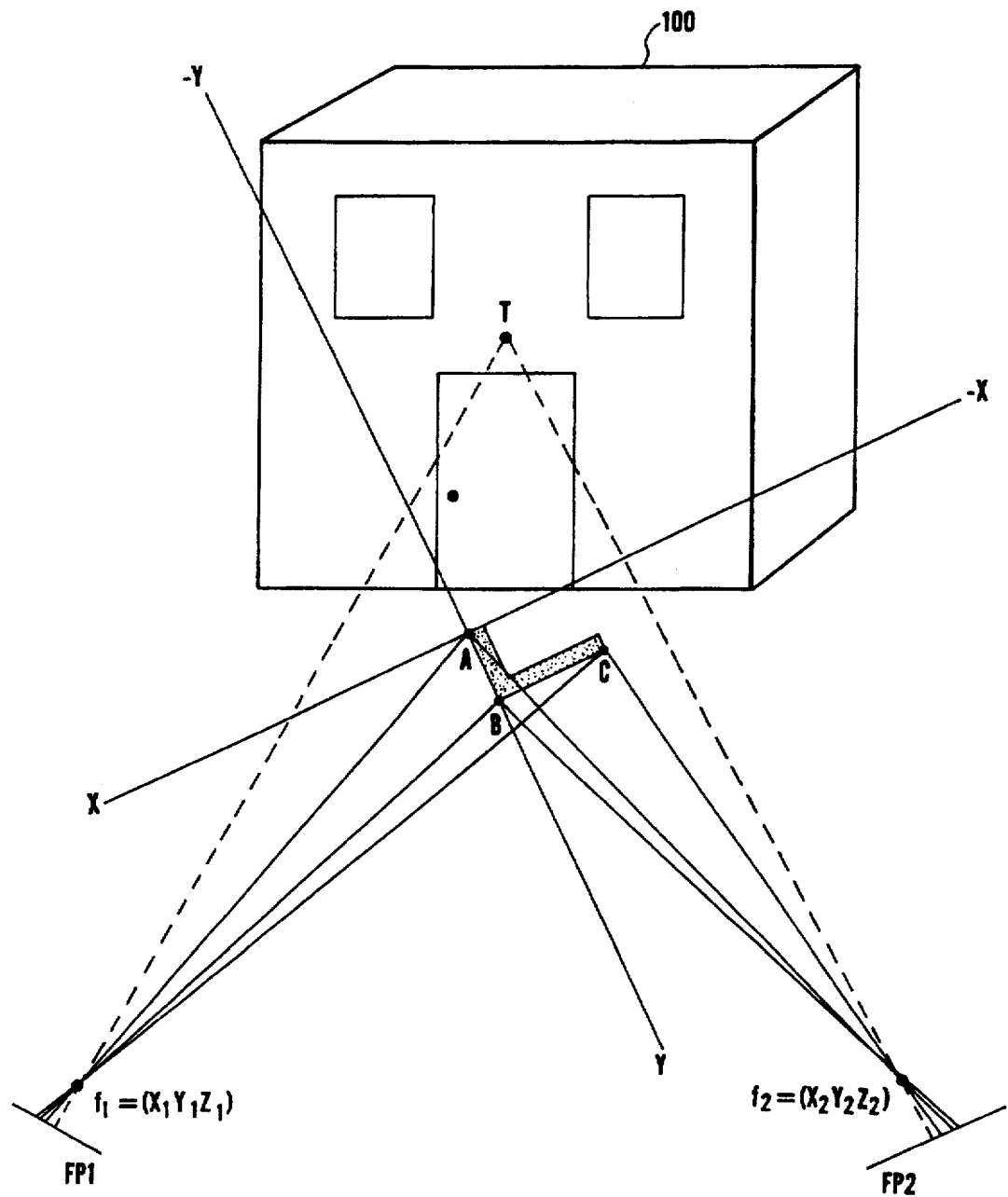
FIG. 1 is an illustration of the capture of two images of a scene, including a building, according to the invention.

FIG. 1 illustrates a building 100 in front of which is located a calibrated target such as a builder's square 110. Pictures of the building are taken from two positions. The first from point $f_1$ and the second from point $f_2$. $f_1$ is the location of the principal point of the lens or lens system of a camera and the image projected through that point falls on image plane $fp_1$. A second image of the scene is captured from position $f_2$ and the image through principal point $f_2$ is cast upon image plane $fp_2$. The positioning of the cameras is arbitrary. In some circumstances, it is desirable to capture images from two locations using the same camera. In other circumstances, it may be desirable to capture the images using different cameras.

Typically, the camera is aimed so as to center the object of interest within the viewing frame. In the picture shown, both cameras are pointed at center point T which means that the images of points A, B and C on the builder's square are not in the center of the image.

Once images are available in viewable form for analysis, knowing the distance between the principal point and the image plane of the camera (principal distance) and the physical displacement of the points on the reproduced image, one may calculate the angles $Af_1B$, $Bf_1C$ and $Cf_1A$ because the angles subtended by pairs of points vis-a-vis the principal point are identical whether they are measured in the real scene or on the image plane side of the focal point.

In the implementation of this invention, a real world coordinate system is defined with the Y axis running through points A and C and an X axis defined perpendicular to the Y axis through point A in the plane of A, B and C, thus forming an origin 0 at point A. A Z axis is defined perpendicular to the XY plane and running through point A. By convention, the +Y direction runs from the origin at A to point C, the +X direction runs to the right when standing at the origin and facing the +Y direction and the +Z direction proceeds in a vertical direction from the origin out of the XY plane in a direction indicated by the cross product of a vector in the +X direction with a vector in the +Y direction.

Given this coordinate system, it is desirable to calculate the location of the camera, namely, the location of the principal point of the camera from which an image was captured. Thus, principal point $f_1$ is located at $(X_1, Y_1, Z_1)$. Likewise, the principal point $f_2$ is located at $(X_2, Y_2, Z_2)$.

With respect to that coordinate system, one can see that a camera directed at target point T has both an azimuth and an elevation which can be specified utilizing the coordinate system. In addition, the camera may be rotated about the optical axis of the camera differently when the two pictures were taken. In short, there is no guarantee that the camera was horizontal to the XY plane when the picture was taken and thus, the orientation of the images may require correction prior to processing.

Figure 2:
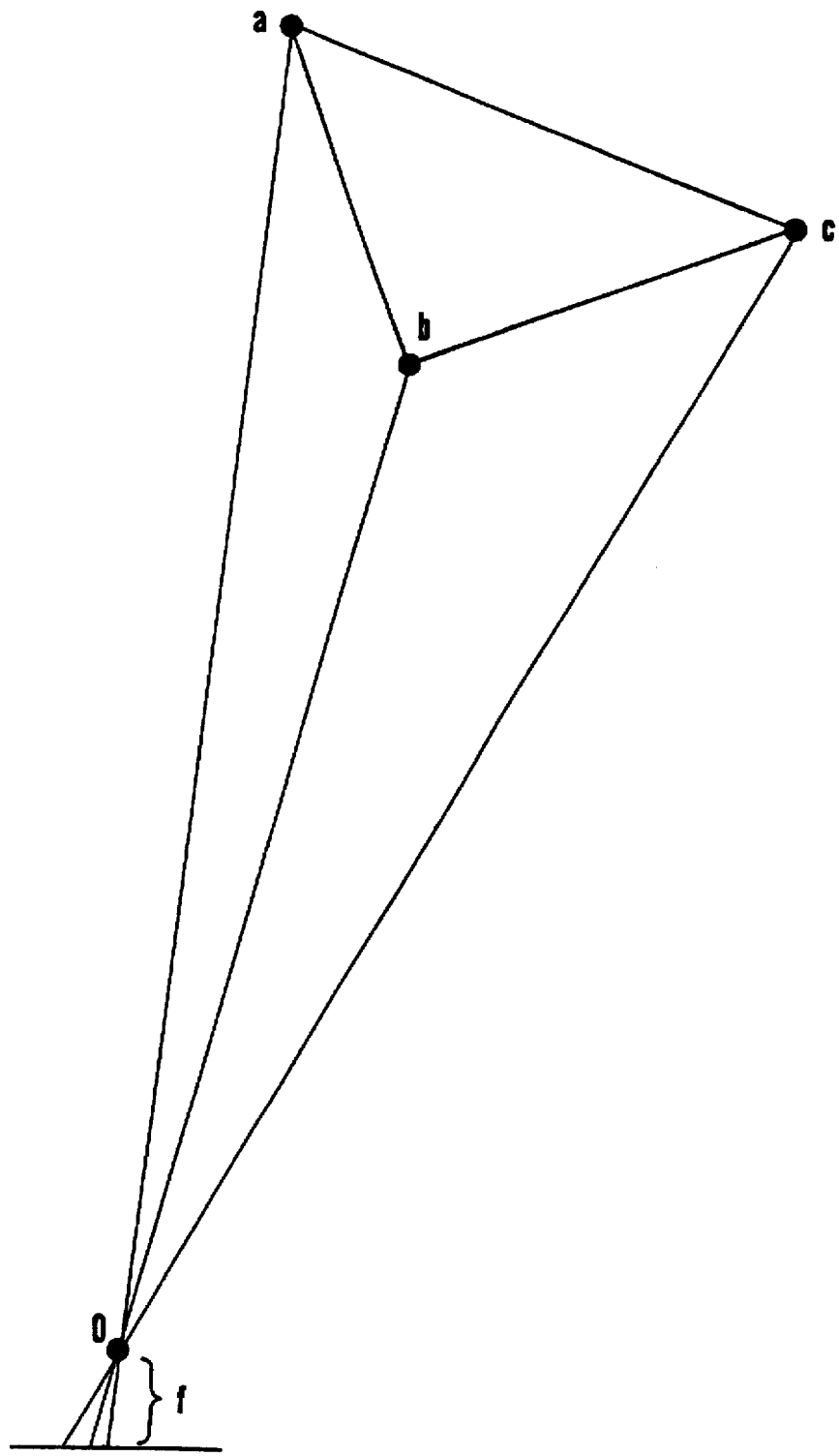
FIG. 2 is an illustration of a viewing pyramid of three calibration points as projected through the focal point of a camera.

FIG. 2 illustrates a viewing pyramid formed by the three points A, B and C vis-a-vis the origin 0 (the principal point of a camera). The viewing pyramid can be viewed as having three surfaces, each corresponding to a surface triangle, namely, triangles AOB, BOC and COA. If one were to view the pyramid shown in FIG. 2 as hollow and made of paper and if one were to cut along the line OA and flatten the resulting pattern, one would achieve a flattened pyramid such as shown in FIG. 3.

Figure 3:
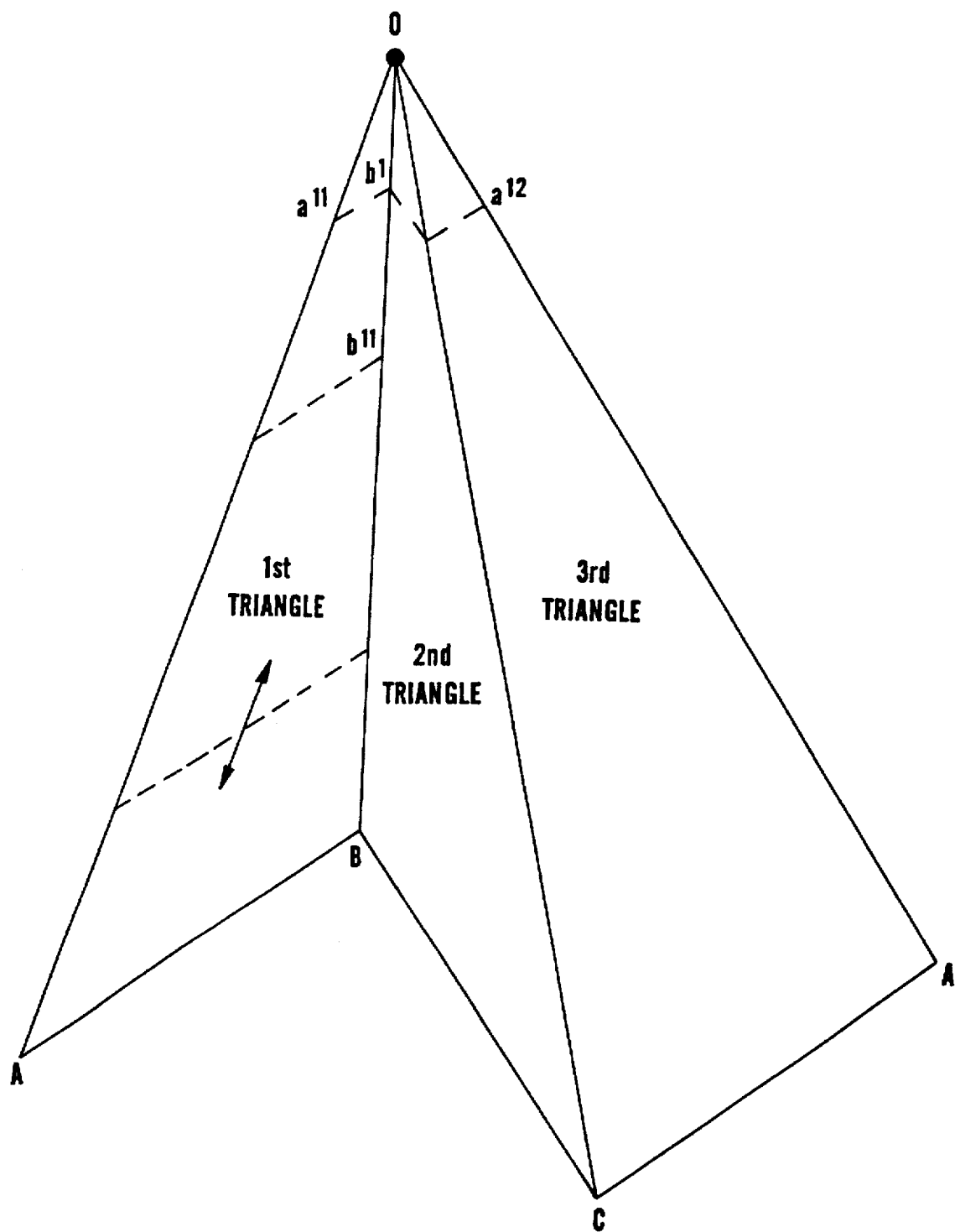
FIG. 3 is an illustration of a flattened pyramid used for calculation of camera distance.

FIG. 3 will be utilized to describe the process by which camera position is determined in accordance with the invention. The distance OA represents the distance from point A which is at the origin of the coordinate system to point O which is at the principal point of the lens.

At the beginning of the determination, one knows values for angles AOB, AOC and BOC by virtue of knowing the distance between the principal point and the image plane and the measured distance separating two points on the image plane.

Figure 4:
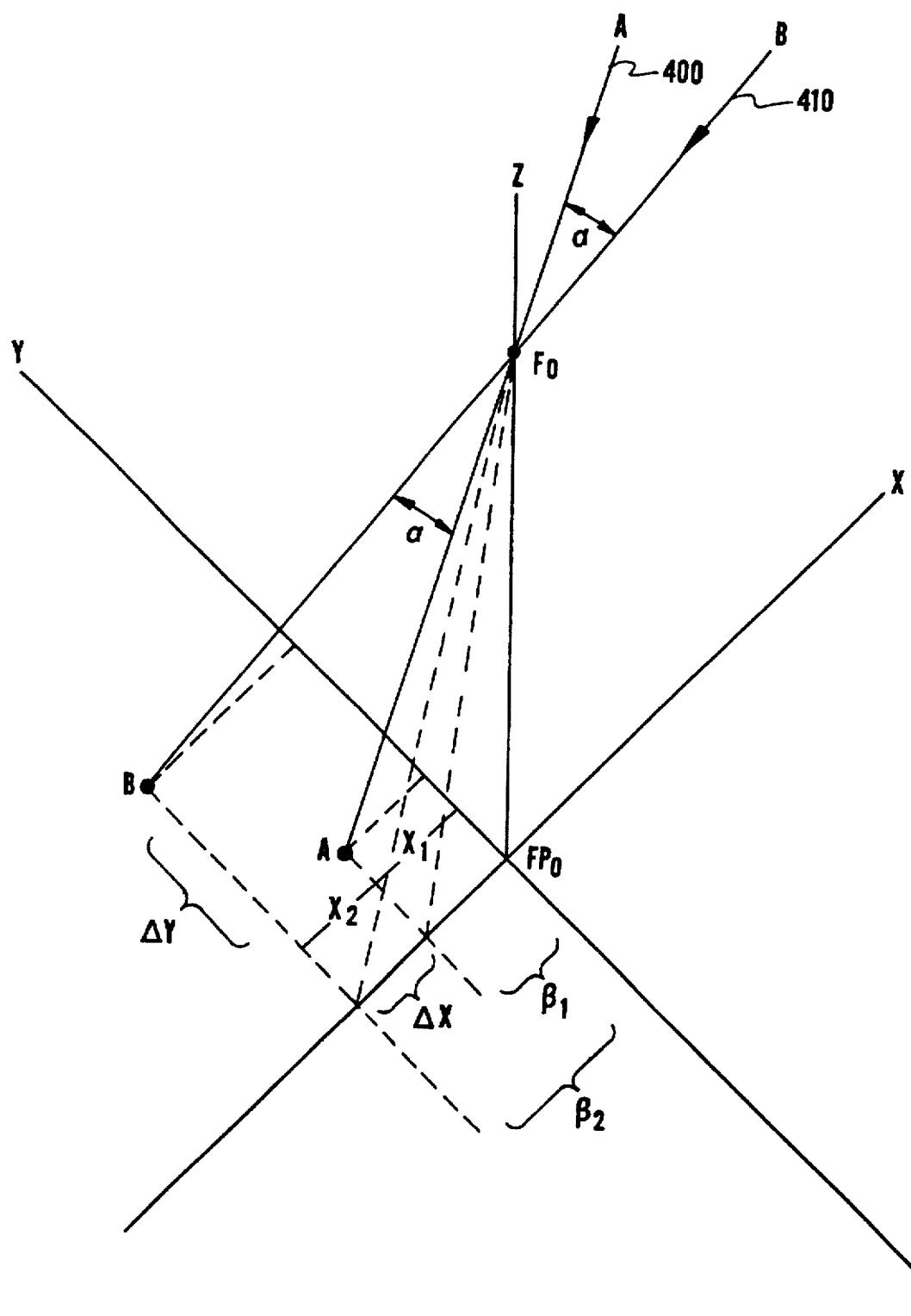
FIG. 4 is an illustration of viewing angle determination used in calculation of camera distance.

FIG. 4 assists in illustrating how this is done. In FIG. 4, the XY plane constitutes the image plane of the camera. $f_0$ is the principal point of the lens. Images of points A and B are formed on the image plane after passing through the principal point at locations A and B shown on the XY plane. The incoming rays from points A and B are respectively shown at 400 and 410 of FIG. 4. For purposes of image plane analysis, an image plane origin $FP_0$ is defined and an X axis is defined as parallel to the longest dimension of the image aspect ratio. The Y axis is formed perpendicular thereto, and the origin $FP_0$ lies directly under the principal point. Rays from points A and B form an angle alpha (<α) as they pass through the focal point. The projection of those rays beyond the focal point also diverge at <α. <α corresponds to <AOB of FIG. 3.

By taking careful measurements from the image capture medium (e.g. photographic film, digital array etc.), one can determine the distances $AFP_0$ and $BFP_0$.

Calculating the distances $AF_0$ and $BF_0$ using the Pythogorean Theorem using the known distance $F_0FP_0$ (the distance between the principal point and the focal plane) and measured distance $AFP_0$ and $BFP_0$, one may determine angle 2 using the law of cosines as follows:

$$AB^2=(F_0A)^2+(F_0B)^2-2(F_0A)(F_0B)\cos \alpha \qquad (1)$$

$$\alpha=\text{arc cos } [((F_0A)^2+(F_0B)^2-(AB)^2)/2(F_0A)(F_0B)] \qquad (2)$$

Thus, by analyzing points in the focal plane, the angles separating points A, B and C can be determined in the manner just described.

The distances separating points A, B and C are also known, either a priori by placing a calibrated target, such as a carpenter's square in the scene being photographed, or by measuring the distances between three relatively permanent points in the scene previously captured after the images have been formed.

In FIG. 3, the distance OA represents the distance from the principal point of the camera (O) to point A which is the origin of the coordinate system utilized to define camera position. At a high level, this is done by first assuming a very low estimate for the distance OB, such as the distance $Ob^1$, then with that assumption, triangle AOB is solved. "Solving a triangle" means establishing (e.g. calculating) values for the length of each side and for each of the angles within the triangle. With the distance $Ob^1$ assumed, the first triangle is solved using known, assumed or calculated values. In the process, a value for distance OA is calculated. Using the estimate $Ob^1$, the second triangle BOC is solved and the derived distance OC is then utilized to solve the third triangle COA. When the third triangle is solved, the calculated value for OA of the third triangle is compared with the calculated value of OA of the first triangle and the estimate $Ob^1$ is revised by adding the difference between the values for OA from the third triangle and the value for OA from the first triangle to the estimate $Ob^1$ and the process is repeated. By successive iterations, the estimate $Ob^1$ will be improved until the difference between the calculated values of OA reduces to a value less than ε. When ε is low enough for the accuracy needed, the iterations cease and the true value of OA is assumed to lie between the values calculated for the first and third triangles.

A calculation of one iteration will illustrate in detail how this is done.

From the law of sines, one knows:

$$\frac{\text{Sin} <AOB}{AB} = \frac{\text{Sin} <OAB}{Ob^1} \tag{3}$$

Distance $Ob^1$ is the estimate of the length of OB, which, at the outset, is set to be low. The distance AB is known because the dimensions of a calibrated target are known or because the distance AB has been measured after the images are captured. The value for <AOB is calculated from measurements from the image plane as illustrated in FIG. 4 and discussed in connection with equations 1–7. Therefore, <OAB can be calculated as follows:

$$<OAB = \text{Sin}^{-1}\left[ Ob^1 \times \frac{\text{Sin} <AOB}{AB} \right] \tag{4}$$

Once the first estimate of <OAB is known, the first estimate of <OBA can be calculated as follows:

$$<OBA = 180° - <AOB - <OAE \tag{5}$$

At this point, one knows all three angles of the first triangle of FIG. 3 and is in a position to calculate a value for OA of the first triangle. Again using the law of sines, OA can be determined as follows:

$$\frac{\text{Sin} <OAb^1}{Ob^1} = \frac{\text{Sin} <Ob^1A}{OA} \tag{6}$$

$$OA = \frac{(\text{Sin} <Ob^1A)(Ob^1)}{\text{Sin} <OAb^1} \tag{7}$$

At this point, the first triangle is entirely solved under the assumption that the distance $Ob^1$ is the actual value of length OB.

Turning to the second triangle, $Ob^1$ is assumed to be the distance OB. Distance BC is known from the target or measurements and angle BOC is known from measurements from the image plane. Thus, there is enough information to solve the second triangle completely as shown in equations 13–17.

$$\frac{\text{Sin} <BCO}{Ob^1} = \frac{\text{Sin} <BOC}{BC} \tag{8}$$

$$<BCO = \text{Sin}^{-1}\left[ \frac{Ob^1 \times \text{Sin} <BOC}{BC} \right] \tag{9}$$

$$<OBC = 180° - <BCO - <BOC \tag{10}$$

$$\frac{\text{Sin} <OBC}{OC} = \frac{\text{Sin} <BOC}{BC} \tag{11}$$

$$OC = \frac{BC \times \text{Sin} <OBC}{\text{Sin} <BOC} \tag{12}$$

With the distance OC calculated as shown in equation 12, the same information is available with respect to the third triangle that was available at the beginning of the solution of the second triangle. Therefore, the third triangle can be solved in a manner completely analogously to the solution of the second triangle substituting in the corresponding lengths and angles of the third triangle in equations 8–12.

One result of the solution of the third triangle is the distance OA which has been calculated as set forth above. This distance OA from the third triangle will have been derived based on calculations from the first, second and third triangles. Note, however, that the distance OA from the third triangle and the distance OA from the first triangle should be identical if the assumed value $Ob^1$ were equal in fact to the real length OB. Since $Ob^1$ was initially assumed to be of very low value, there will be generally a difference between the value of OA from the third triangle as compared with that from the first triangle. The difference between the two calculated lengths is added to original estimate $Ob^1$ to form an estimate $Ob^2$ for the second, iteration.

With the distance assumed to be $Ob^2$, the calculations set forth above for the solution of the first, second and third triangles are repeated and the resulting values for OA from the first and third triangles are compared once again and an adjustment made to the estimate $Ob^2$ based on the difference between the lengths as set forth above.

By successive iteration, the estimate for the distance OB can be made accurate to whatever degree of resolution one desires by continuing the iterative process until the difference between OA from the first triangle and that from the third triangle is reduced to an acceptable level, ε. The distance OA which results from the iterative process is then equal to the distance of the principal point of the camera shown at O in FIG. 3 to point A which is the origin of the coordinate system defined for this set of measurements.

If the values for OA from the first and third triangles agree within ε, all of the triangles are solved and therefore the entire viewing pyramid is solved.

Figure 5:
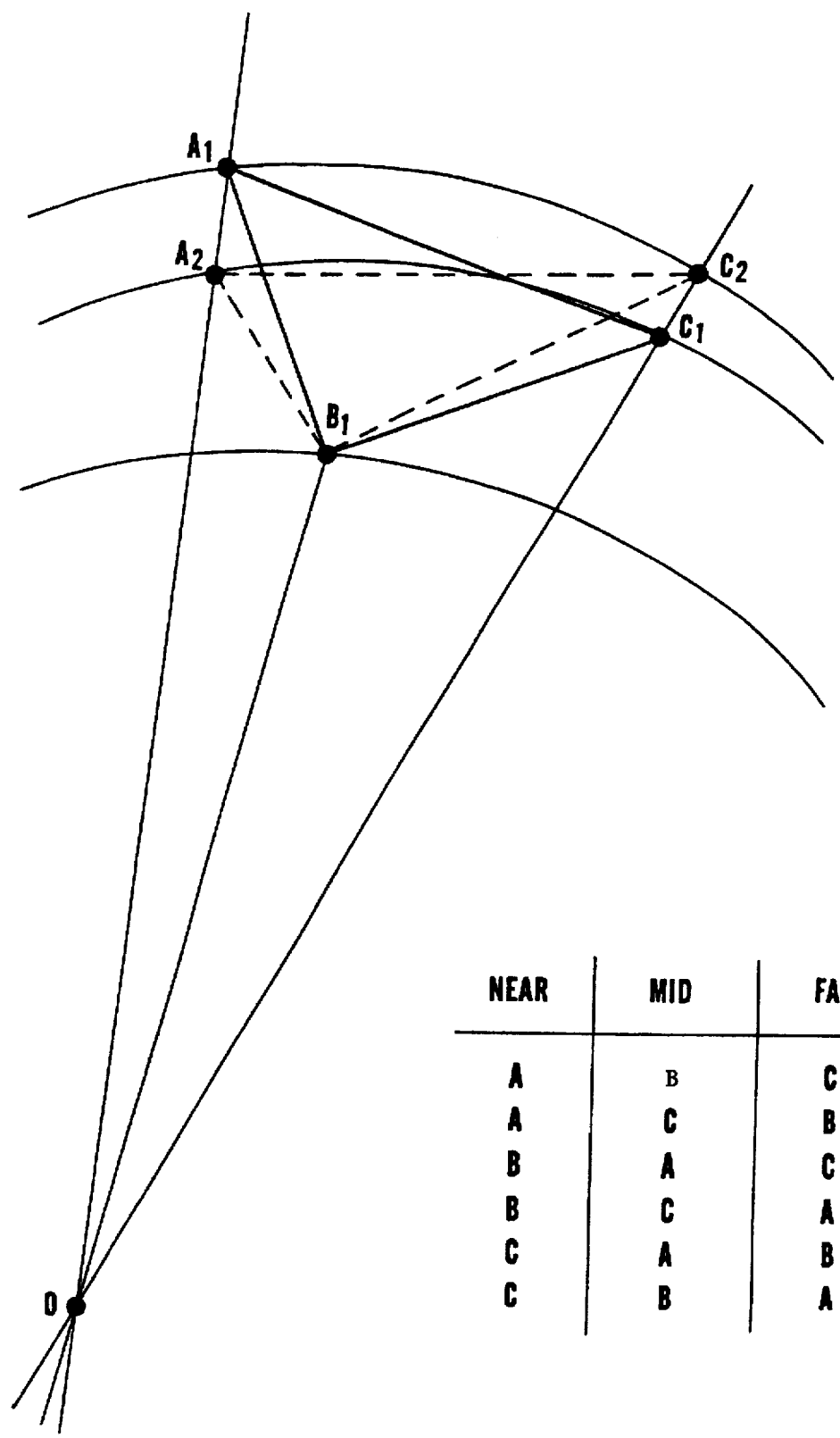
FIG. 5 is an illustration of near, mid and far ambiguity.

Turning to FIG. 5, when viewing the points A, B and C from the principal point of the camera, one cannot necessarily determine which of points A, B and C are closest and next closest to the camera. For example, in FIG. 5, given that point $B_1$ is closest to the camera, it is possible that either point A is closer and point C farther, or alternatively, that point C is closer and point A farther. These differences are reflected in triangles $A_1B_1C_1$ as compared with triangle $A_2B_1C_2$. The table shown in FIG. 5 illustrates that the relationship between points A, B and C may in general result in six different permutations. There will always be these combinations of near, mid and far when working toward a solution. Right at the start, one doesn't know which point is closest to the camera and which is furthest and which is midpoint.

To avoid incorrect answers, it is desirable to try all combinations. For each of the combinations one assumes that one knows which one is which and then tries the calculation. If the calculation converges to a potential solution, then one holds that solution over for further analysis. If one is close to the plane of a particular triangle, there can be as many as five potential solutions or orientations of the triangle that will give you the same relationship of side lengths and viewing pyramid apex angles.

If a particular combination of near, mid and far is not feasible, the calculations do not converge and the process blows up, usually terminating in a math error, typically in a trigonometric function. However, if the calculations proceed normally, then potential solutions are realized and each potential solution is retained for further investigation.

In FIG. 5, it is clear that sometimes there may be degeneracy in which two or more points are located at exactly the same distance from the focal point. That reduces the number of different possible solutions.

During the iterative process, in the example shown above, the difference between OA of the first and third triangles is added to the estimate Ob$^1$ to determine the estimate to be utilized in the next iteration. It is, of course, possible to utilize a factor other than 1 to 1 and to adjust the estimate by a fraction or a multiple of the difference between the values of OA for the first and third triangles. The preferred adjustment, however, is 1 to 1.

When utilizing a calibrated target, it is preferred that a right angle calibration target be used, like an 8 ½×11 piece of paper or a carpenter's square.

The six potential arrangements of near, mid and far for points A, B, C can be viewed as different ways of flattening the pyramid. Three sets of flattened pyramids can be formed by using each vertex OA, OB and OC as the edge which is "opened" (e.g. If the pyramid were formed by folding paper into a pyramid shape, and one vertex were cut open and the pyramid unfolded into a pattern like that shown in FIG. 3, three different sets of flattened pyramids are formed, each by cutting a different vertex). Each set has two members corresponding to the two orders in which the triangles may occur. As illustrated in FIG. 3, for example, the triangles are solved in 1-2-3 order. This ordering represents one of the 2 members. The other member is formed by flipping the flattened pyramid over on its face so that triangle 3, as shown in FIG. 3 is put in the triangle 1 position. This member of the set is solved in 3-2-1 order as labeled.

The 1-2-3 ordering of the solution of the triangle of a flattened pyramid implicitly assumes that the left (and right) exterior edge (OA in the figure) is the farthest, the next (OB) is intermediate (mid) and OC is closest.

When searching for a solution for each of the possible arrangements of near, mid and far, the algorithm converges only for that (those) solution(s) which are "possible". Usually only one of the 6 combinations is possible. However, sometimes degeneracy occurs when 2 (or 3) points are exactly the same distance away. In such a case, multiple solutions are possible but they will yield to the same result.

Thus convergent solutions will uniquely define the X, Y and Z locations of the camera in the coordinate system defined by the points A, B and C as set forth above.

The techniques described herein are applicable to images photographed without a calibrated target. By selecting 3 convenient points on the image and physically measuring the distance between them after the image has been captured, the same effect can be achieved as is achieved using a calibrated target at the time the image is captured.

Figure 6:
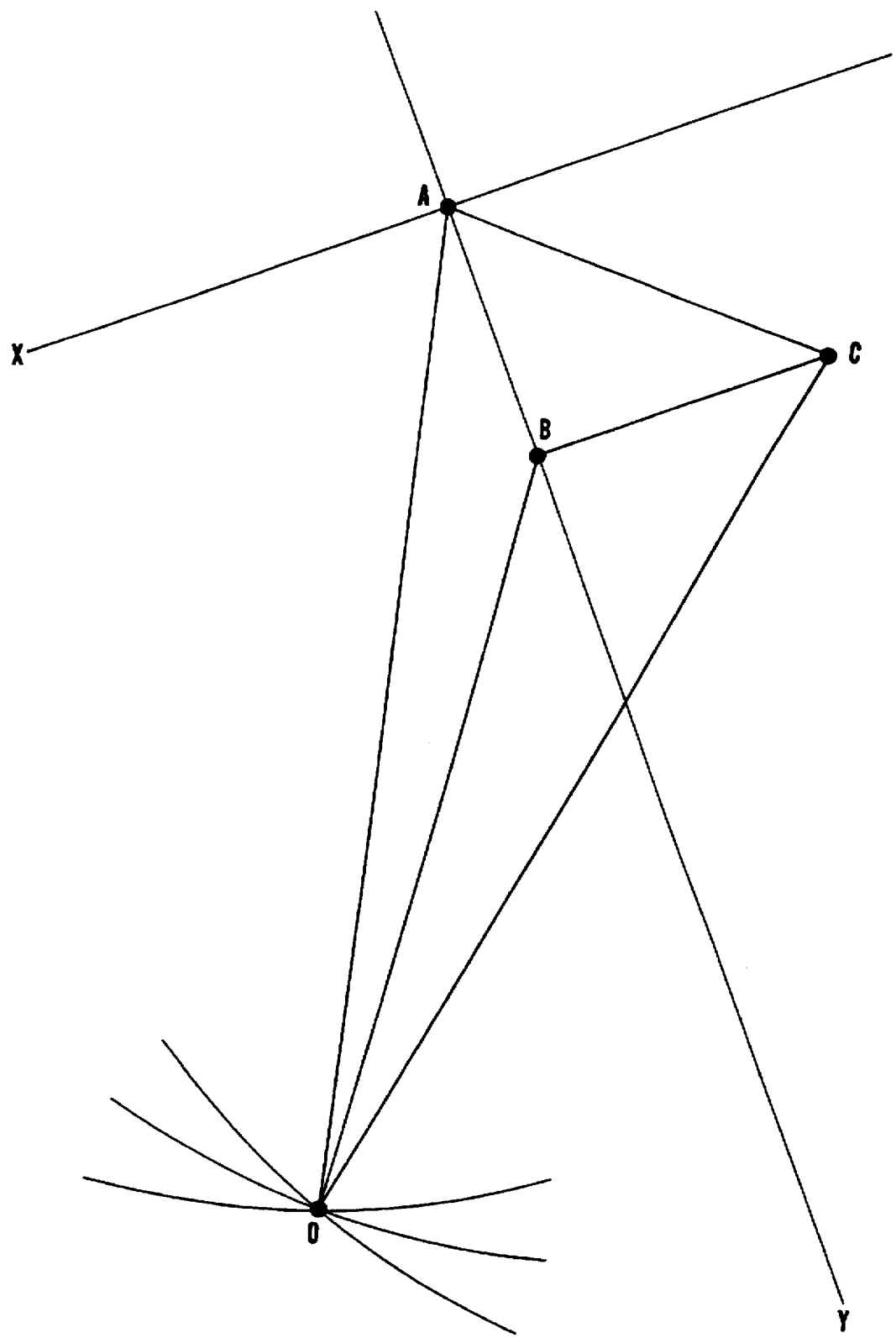
FIG. 6 is an illustration of how to resolve near, mid and far ambiguity.

To resolve the near, mid and far ambiguities, as shown in FIG. 6, one notes that the principal point of the camera is going to be where the known lengths of OA, OB and OC coincide at point O. For each of the possible solutions for the location of point O, one can then write an equation for a sphere about the point A, about point B and then about point C. The intersection of the spheres can be understood by visualizing two soap bubbles coming together. As they get progressively closer, they can touch at one point and then as one penetrates the other it will generate a circle which will be a locus of points that is common to the two spheres. As long as the spheres are not identically the same size, one bubble will go inside of the other and as it goes inside it will, at worst case, touch again at one point. As it goes out the other side, it will touch at a point, form a circle, and then as it leaves it will touch a diametrically opposite point.

By writing equations for spheres centered at points A, B and C with radii respectively of length OA, OB and OC, one obtains three equations in three unknowns (assuming a rectangular coordinate system).

Each of the possible solutions for near, mid and far is utilized to generate a set of spheres which are then solved for common points of intersection. Looking at FIG. 6, one can see that in addition to intersection at point O of the three spheres in the +Z plane, there will be a symmetrical solution in the -Z plane. By convention, one assumes that the horizontal control grid established by the XY plane is viewed from the +Z direction looking down on the XY plane. By that convention, there is only one solution and that is the one is the +Z space and the -Z space solution is eliminated. That then determines the XYZ location of the principal point of the camera.

Figure 7:
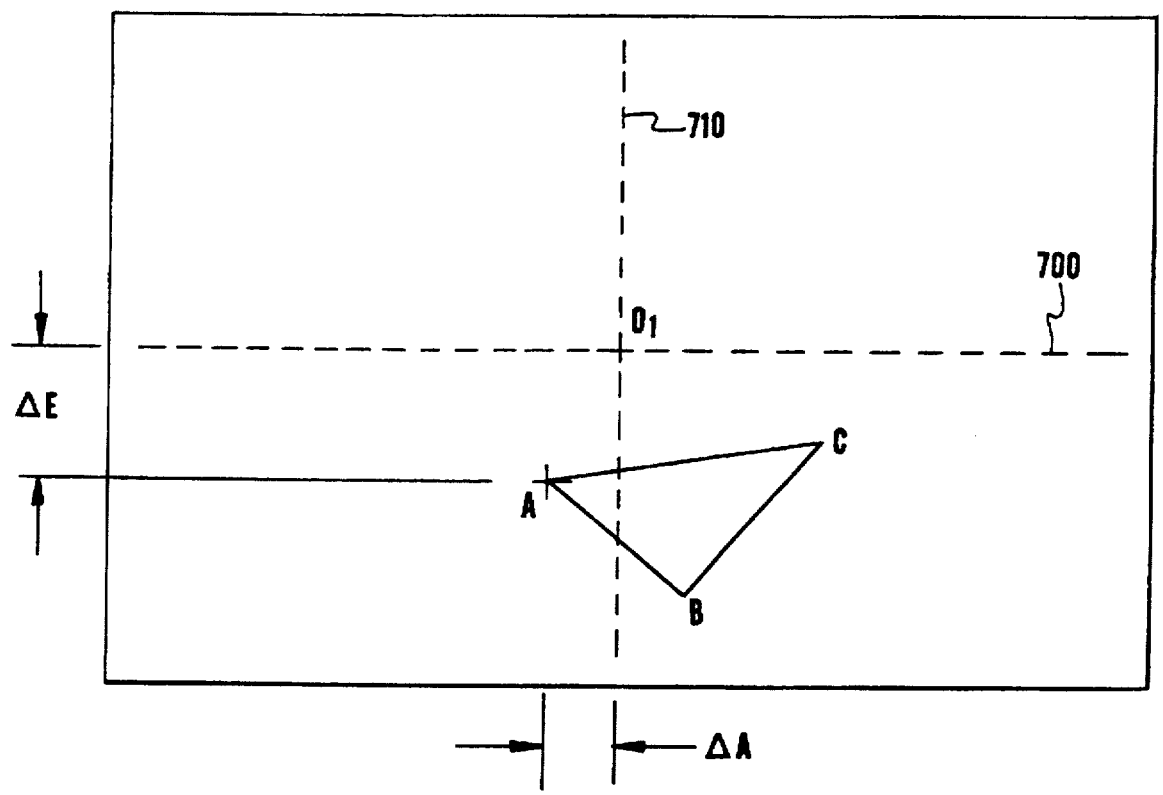
FIG. 7 is an illustration of azimuthal and elevational correction.

Once the camera position is determined, there are three possible orientations for the camera which need to be specified. They are (1) the azimuthal rotation, (2) the elevation rotation and (3) the tilt about the optical axis. FIG. 7 illustrates how azimuthal and elevational corrections are determined. FIG. 7 illustrates the image plane. Points ABC are the same points ABC utilized to define a coordinate system and to calculate the distance of the camera in that coordinate system. Points A, B and C are illustrated as part of the image shown in the image plane. A center of the plane (i.e. the center of the picture) is typically placed on the object of interest so that the object of interest appears in the center of the image. A calibrated target or the three points utilized to establish a coordinate system, A, B and C, are typically not at the center of the photograph. The azimuthal correction is essentially that required to displace point A, the image of the origin of the external world coordinate system so that it lies exactly on top of the photographic location of point A shown to the right of axis 710 of the coordinate system of the image plane. The elevational correction is the angle of elevation or declination required to place the image of point A exactly on top of the photographic location of point A shown below the abscissa of the image plane coordinate system 700. In short, azimuthal and elevational corrections are determined such that if they were applied to the camera, point A, the origin of the real world coordinate system would coincide with point A, the origin as captured on the photograph.

Mathematically, the differential offset angles, that place the image of the origin of the real world coordinate system exactly on point A in the image plane, are calculated as follows:

$$\theta_x = \tan^{-1}\left(\frac{\Delta A}{f}\right) \tag{13}$$

$$\theta_x = \tan^{-1}\left(\frac{\Delta E}{f}\right) \tag{14}$$

The corrections required to coalign or superimpose points A are shown in FIG. 7.

FIG. 7 assumes that if A is correctly located, points B and C will be correctly located. However, this is generally not true because of tilt of the camera about the optical axis. Once points A have been superimposed, one knows where point B should be because of the axis definitions in the real world coordinate system. If the origin of the real world coordinate system centered on A, and the origin of the image plane coordinate system, now also centered on A by virtue of the azimuthal and elevational corrections applied in connection with FIG. 7, then point B on the image plane should be located where point B in the real world coordinate system is located. This would be the case if the camera were absolutely horizontal when the picture was taken. However, if there is tilt, B will be displaced off the axis. On the image plane, one knows the actual angle that the line AB makes to the X axis of the image plane by measurement from the image plane. By taking the viewing pyramid and projecting it onto a projection plane, as is commonly done when projecting three dimensional images onto a two dimensional surface, one can determine what angle BAC should be on the image plane. To correct for camera tilt, one must rotate the image plane about the optical axis. However, doing so potentially changes the location of points A, B and C requiring another iteration of corrections in which points A are superimposed and the amount of tilt recalculated until the points converge to an arbitrary amount of error $\epsilon_1$.

Using these techniques, convergence can commonly be achieved to an accuracy of 1 part in $10^{-14}$. If there is more than one convergent candidate, the B point residual error and the C point residual error are utilized as discriminators.

Figure 8:
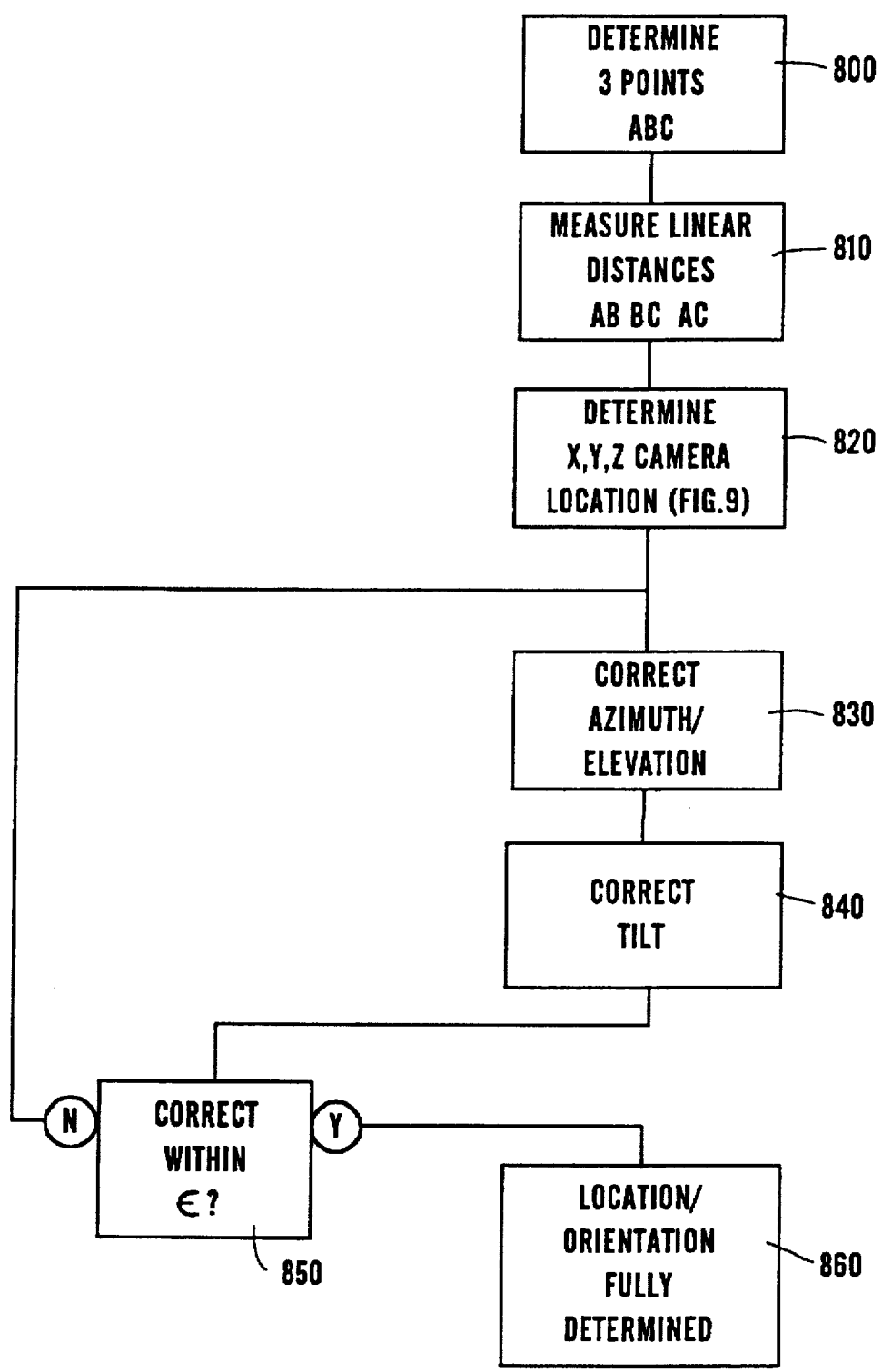
FIG. 8 is a flow chart of the algorithm used to determine camera distance and orientation.

FIG. 8 illustrates the process utilized to fully determine the location and orientation of a camera from the image. At step 800, one determines the location of the calibration points A, B and C and either knows or measures the distances between them (810). The camera location in XYZ coordinates is determined using the technique set forth in FIG. 9. Once the XYZ camera location is determined, corrections are made to azimuth and elevation (830) and then to tilt (840). With azimuth and tilt correction made, one determines whether the points are correctly located within a desired accuracy $\epsilon$ (850). If they are, the location and orientation of the camera is fully determined (860) and the process ends. If they are not, another iteration of steps 830 and 840 is undertaken to bring the location determination within the desired accuracy.

Figure 9:
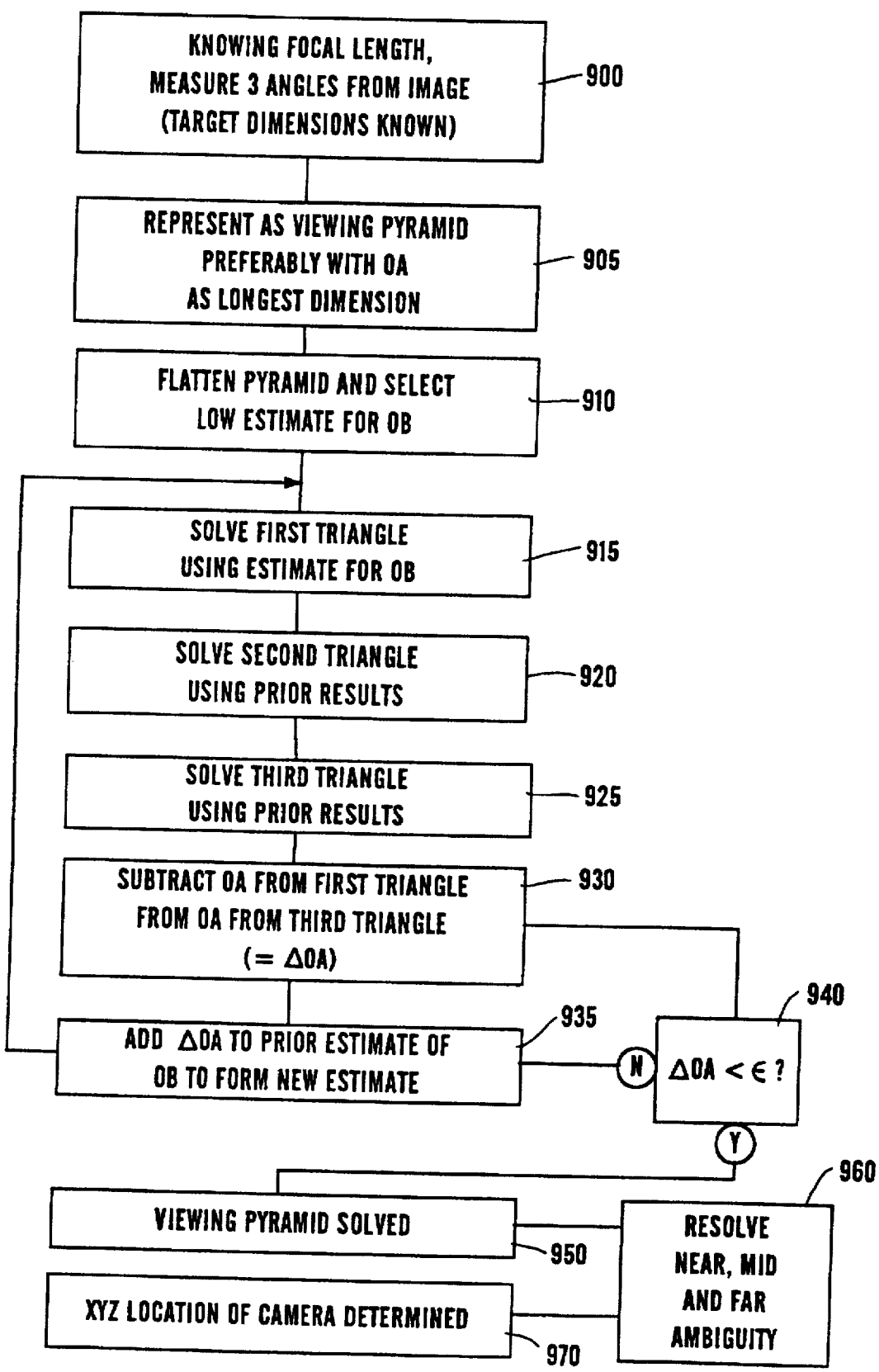
FIG. 9 is a flow chart of the algorithm used to calculate camera location.

FIG. 9 illustrates the details of block 820 of FIG. 8. Knowing the principal distance of the camera, one measures the three angles AOB, BOC and COA from the image plane (900). A viewing pyramid is constructed with distance OA assumed as the longest dimension (905). The pyramid is flattened and a value estimated for line segment OB which is known to be low (910). Using the estimate for OB, the first triangle is solved (915). Second and third triangles are then sequentially solved using the results of the prior calculations (920 and 925). If the difference between the value for OA calculated in connection with the first triangle differs from the value for OA calculated from the third triangle (930) by an amount greater than $\epsilon$ (940), the value $\Delta$OA is added to the prior estimate of OB to form a new estimate and a new iteration of steps 915, 920, 925, 930 and 940 occurs. If $\Delta$OA<$\epsilon$ (940), then the viewing pyramid is solved (950) and it is only necessary to resolve the near, mid and far ambiguity (960) before the objective of totally determining the position and orientation of the camera (970) is achieved.

Figure 10:
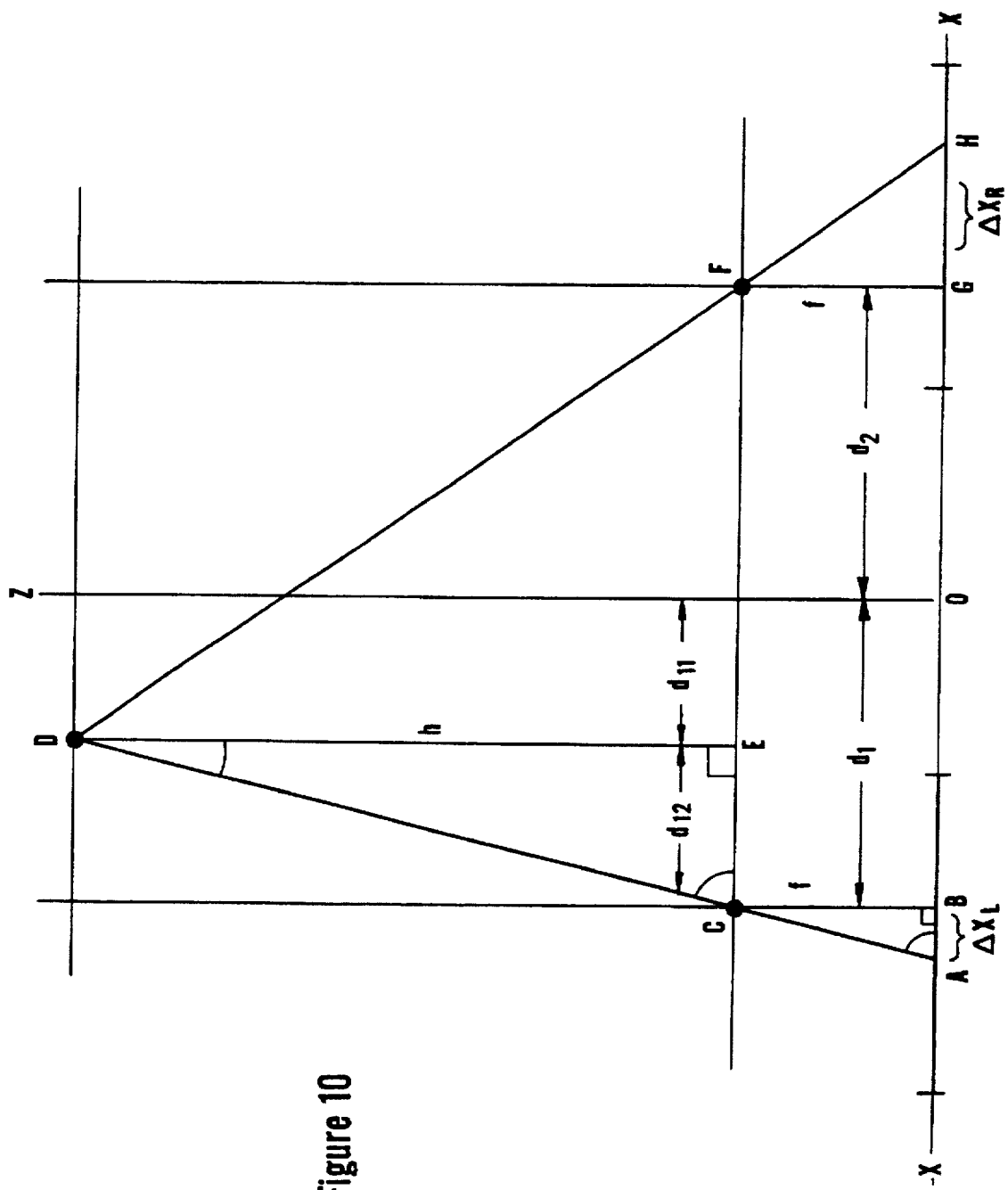
FIG. 10 is an illustration of how to calculate the distance of a point from a line joining the principal points of two cameras.

If the images had been captured with two cameras aligned as shown in FIG. 10, the location of the point $X_1$, $Y_1$, $Z_1$ would be calculated as follows:

Assume a set of axes with origin at 0, the X and Z axes as shown in FIG. 10 and the Y axis being perpendicular to the plane of the page. Assume that the images are captured with an objective at point C and an objective at point F in FIG. 10. The distance between C and F being $d_1+d_2$. The camera capturing the image will have a known focal length F and the image plane corresponding to each of the points at which the image is captured is shown in a heavy line on the X axis. The distance of the point labeled D from the line joining the focal points of the camera (C & F) can be calculated as follows:

Triangles ABC and CED are similar in a geometric sense and triangles DEF and FHG are also similar.

Because they are similar, $$\frac{h}{f} = \frac{d_{12}}{\Delta X_L} \qquad (15)$$

$$\frac{h}{f} = \frac{d_2 + d_{11}}{\Delta X_R} \qquad (16)$$

$$d_I = d_{II} + d_{I2} \qquad (17)$$

$$\frac{h}{f} = \frac{d_{12}}{\Delta X_L} = \frac{d_2 + d_{11}}{\Delta X_R} \qquad (18)$$

Equating (20) and (21) as shown in (23) and the subtracting the right hand term from both sides of the equation results in:

$$\frac{d_{12} \Delta X_R - (d_2 + d_{11}) \Delta X_L}{\Delta X_L \Delta X_R} = 0 \qquad (19)$$

For (24) to be true, the numerator must=0.

$$d_{12} \Delta X_R - (d_2 + d_{11}) \Delta X_L = 0 \qquad (20)$$

Solving equation 22 for $d_{11}$, substituting in equation 25 and moving the right term to the right side of the equation results in:

$$d_{12} \Delta X_R = (d_2 + d_1 - d_{12}) \Delta X_L \qquad (21)$$

$$d_{12} (\Delta X_R + \Delta X_L) = (d_2 + d_1) \Delta X_L \qquad (22)$$

$$d_{12} = \frac{(d_2 + d_1) \Delta X_L}{(\Delta X_R + \Delta X_L)} \qquad (23)$$

$$d_{11} = d_1 - \frac{(d_2 + d_1) \Delta X_L}{(\Delta X_R + \Delta X_L)} \qquad (24)$$

$$h = f \frac{(d_2 + d_{11})}{\Delta X_R} = f \frac{d_{12}}{\Delta X_L} \qquad (25)$$

Figure 11:
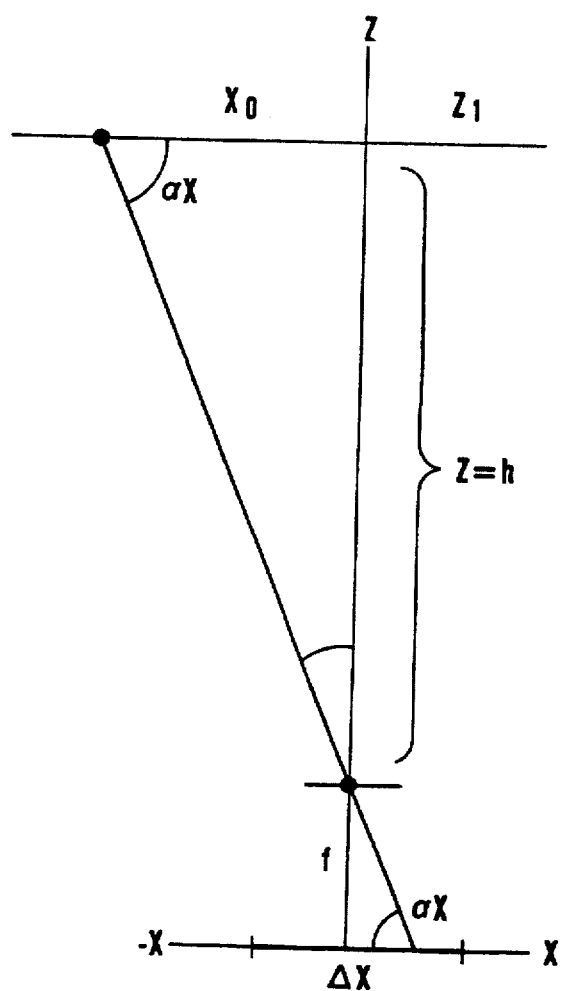
FIG. 11 is an illustration of the calculation of the location of a point in the X direction.
Figure 12:
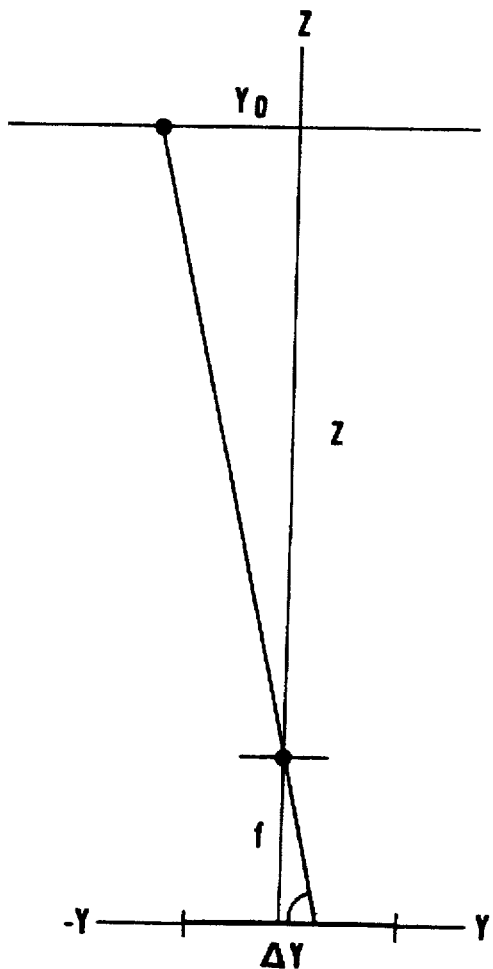
FIG. 12 is an illustration of the calculation of the location of a point in the Y direction.

Once h is known, the coordinates $X_O$ and $Y_O$ of the point O can be defined with respect to a camera axis by the following. See FIGS. 11 and 12.)

$$\alpha_x = \tan^{-1} f/\Delta X \qquad (26)$$

$$\alpha_y = \tan^{-1} f/\Delta Y \qquad (27)$$

$$X_O = -h \cot \alpha_x \qquad (28)$$

$$Y_O = -h \cot \alpha_y \qquad (29)$$

In capturing images under field conditions, the positioning of cameras as shown in FIG. 10 is rarely so cleanly defined.

Figure 13:
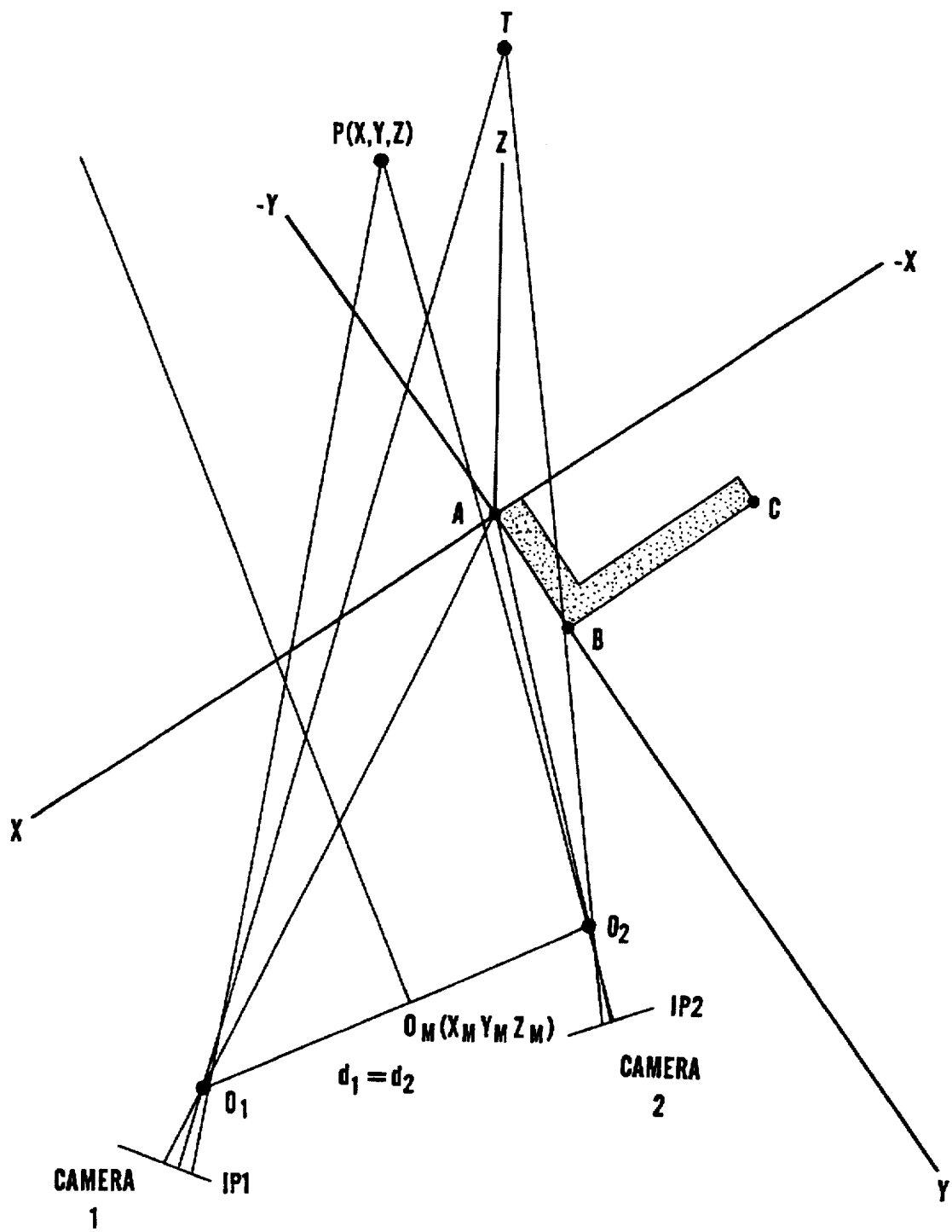
FIG. 13 is an illustration of how to calculate point location generally given a determination of the location and orientation of the camera at the time when two images were captured.

FIG. 13 illustrates a typical real world situation. In FIG. 13 the points A, B and C represent the calibrated target or the points measured subsequent to image capture. The coordinate system X, Y and Z is established in accordance with the conventions set forth above with A as the origin. Camera positions 1 and 2 illustrated only by their principal points $O_1$ and $O_2$ respectively and their image planes $IP_1$ and $IP_2$ respectively, are positioned with their principal points located at $O_1$ and $O_2$ and with their optical axis pointed at point T which would be the center of the field on the image plane. One desires to obtain the coordinates $(X_1, Y_1, Z_1)$ for an arbitrary point P.

This can be accomplished by a two-stage transformation. If one were to draw a line between the focal points $O_1$ and $O_2$ and define a mid-point $OM(X_m, Y_m, Z_m)$ at the center of that line, and then if one were to perform an azimuthal rotation and if the same kind of rotation were applied to camera 2 about focal point $O_2$ then, the cameras would be oriented as shown in FIG. 10 and the coordinates for point P could be calculated using equations 15–19 as shown above. However, the coordinates calculated are with reference to point O of FIG. 10 which corresponds to point $O_m$ of FIG. 13. To obtain the coordinates of point P with reference to the world coordinate system defined for measurements requires then only a simple coordinate transformation to change the representation from a coordinate system centered at $O_m$ to one centered at point A. This is done routinely using well-known mathematics.

Figure 14:
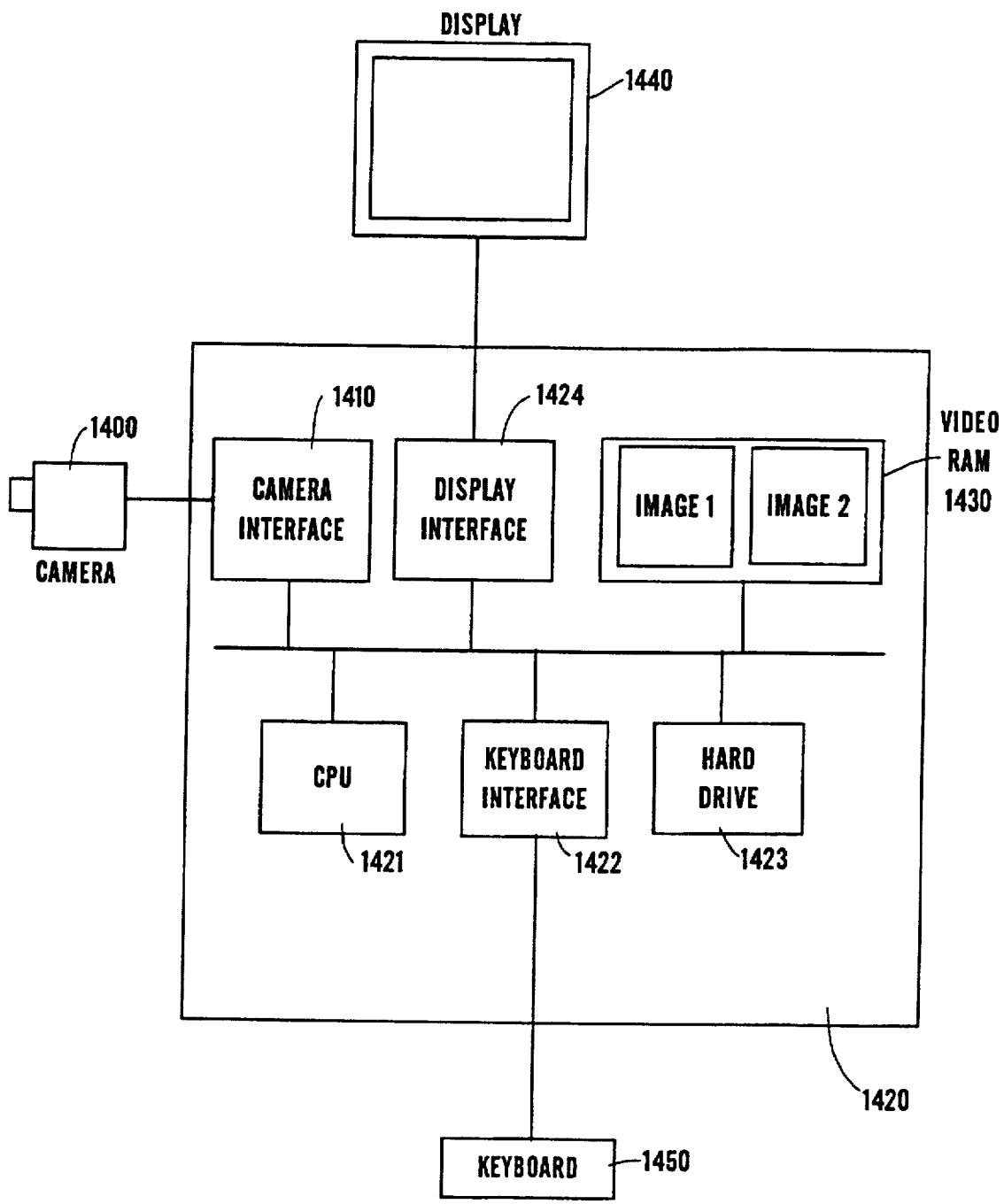
FIG. 14 is an illustration of hardware utilized in accordance with the invention.

FIG. 14 illustrates hardware utilized to carry out certain aspects of the invention. Camera 1400 is used to capture images to be analyzed in accordance with the invention. Camera 1400 may be a digital still camera or a video camera with a frame grabber. Images from the camera are loaded onto computer 1420 using camera interface 1410. Normally, images loaded through interface 1410 would be stored on hard drive 1423 and then later retrieved for processing in video RAM 1430. However, images can be loaded directly into video RAM if desired. Video RAM 1430 preferably contains sufficient image storage to permit the simultaneous processing of two images from the camera. Video display 1440 is preferably a high resolution video display such as a cathode ray tube or a corresponding display implemented in the semiconductor technology. Display 1440 is interfaced to the computer bus through display at interface 1424 and may be utilized to display individual images or both images simultaneously or three dimensional wire frames created in accordance with the invention. Keyboard 1450 is interfaced to the bus over keyboard interface 1422 in the usual manner.

When utilizing a computer implementation, such as found in FIG. 14, distance measurements may be conveniently measured in number of pixels in the vertical and horizontal direction which may be translated into linear measurements on the display screen knowing the resolution of the display in vertical and horizontal directions. Numbers of pixels may be readily determined by pointing and clicking on points under consideration and by obtaining the addresses of the pixels clicked upon from the cursor addresses.

Thus, by knowing the position and orientation of the cameras or other image capture devices, as determined from images analyzed after the capture, one can calculate the precise position in terms of the XYZ real world coordinates in a system centered at point A thus enabling one to specify with great accuracy the position of those points relative to the real world coordinate system.

The techniques set forth herein permit accurate forensic surveying of accident or crime scenes as well as accurate surveying of buildings or construction sites, particularly in the vertical direction which had heretofore been practically impossible.

In this disclosure, there is shown and described only the preferred embodiment of the invention, but, as aforementioned, it is to be understood that the invention is capable of use in various other combinations and environments and is capable of changes or modification within the scope of the inventive concepts as expressed herein.

What is claimed is:

1. A method of measuring the absolute three dimensional location of a point D with respect to a coordinate system defined using three points, A, B and C, separated by known distances using image data comprising:

a. capturing two images of a scene containing the points of B, C and D, using one or more cameras of known principal distance, b. determining the location and orientation of said one or more cameras at the time each of said images was captured with reference to said coordinate system using 3 to 5 points from said images, principal distance and said known distances, c. using the locations of the one or more cameras at the time the images were captured to determine the location of said point D from image data.

2. A method of measuring the absolute three dimensional location of a point D with respect to a coordinate system defined using three points, A, B and C, separated by known distances using image data comprising:

a. capturing two images of a scene containing the points A, B, C and D, using one or more cameras of known principal distance, b. determining the location and orientation of said one or more cameras at the time each of said images was captured with reference to said coordinate system using information derived from said images, principal distance and said known distances, and c. using the locations of the one or more cameras at the time the images were captured to determine the location of said point D from image data by c1. defining an auxiliary coordinate system with origin along the line joining the locations of the cameras, c2. defining the center point of each image as an origin of a set of image reference axes pointing in X', Y' and Z' directions, respectively, c3. measuring offset in at least one of the X' and Y' directions of a point on the first image and of a corresponding point of a second image, c4. determining the angles formed between a line joining point D, the principal point of the objective and the image of point D on one of the X' or Y' planes for each of the images, c5. determining a distance h representing a distance of point d to a line joining principle points of said one or more cameras used to capture said two images using the measured offsets, the focal length and the angles, c6. determining the X' and Y' coordinates of point D in the auxiliary coordinate system, and c7. transforming coordinates (X', Y', h) of the auxiliary coordinate system to a representation in said coordinate system defined using said three points, A, B and C.

3. A method of measuring the absolute three dimensional location of a point D with respect to a coordinate system defined using three points, A, B and C, separated by known distances using image data comprising:

a. capturing two images of a scene containing the points A, B, C and D, usinq one or more cameras of known principal distance, b. determining the location and orientation of said one or more cameras at the time each of said images was captured with reference to said coordinate system using information derived from said images, principal distance and said known distances by, b1. representing the distance between point A, B and C and the principal point of a camera O as a viewing pyramid, b2. modifying the representation of the pyramid to a three triangle flattened representation, b3. selecting a low estimate $Ob^1$ for one interior side of a first triangle of said flattened representation, b4. solving the first triangle using image data, principal distance and said known distances, yielding, inter alia, a first calculated value for length OA, given estimate $Ob^1$, b5. solving the second triangle using results obtained, b6. solving the third triangle using results obtained, yielding, inter alia, a second calculated value for length OA, b7. subtracting the second calculated value for length OA from the first calculated value for length OA to produce a difference value, b8. revising the value of estimate $Ob^1$ by adding said difference value to achieve a revised estimate, b9. iterating steps d–h using the revised estimate until said difference value is less than a desired accuracy, and b10. deriving values for camera location using one or more sets of values for distances OA, OB and OC, and c. using the locations of the one or more cameras at the time the images were captured to determine the location of said point D from image data.

4. The method of claim 3 in which the step of deriving values for camera location using one or more sets of values for distances OA, OB and OC comprises solving simultaneously equations for spheres centered at points A, B and C with respective radii of OA, OB and OC.

5. The method of claim 3, further comprising:

k. determining the orientation of one of more of said cameras by calculating the azimuthal and elevational adjustment required to direct the camera to the location of point A.

6. The method of claim 5, further comprising:

l. determining the orientation of one of more of said cameras by calculating the amount of rotation about the optical axis required to align point B once the camera points at point A.

7. The method of claim 5 further comprising iterating steps k and l until the degree of alignment is within the desired degree of accuracy.

8. The method of claim 1 used to measure the distance between two points.

9. The method of claim 1 used to measure distances in a vertical direction.

10. The method of claim 1 used to locate physical position accurately of objects visible in said images.

11. The method of claim 1 used to create a three dimensional wireframe representation or a three dimensional surface model comprising 3 or 4 vertices surface element.

12. The method of claim 1 used to document the as built condition of an object.

13. A method of measuring the absolute three dimensional location O of a camera with respect to a coordinate system defined using three points, A, B and C, separated by known distances using image data comprising:

a. capturing an image of a scene containing the points A, B, and C, using a camera, b. determining the principal distance of said camera, c. determining the location of said camera at the time said image was captured with reference to said coordinate system using 3 to 5 points from said image, principal distance and said known distances.

14. A method of measuring the absolute three dimensional location O of a camera with respect to a coordinate system defined using three points, A, B and C, separated by known distances using image data comprising:

a. capturing an images of a scene containing the points A, B, and C, using a camera of known principal distance, b. determining the location of said camera at the time said image was captured with reference to said coordinate system using 3 to 5 points from said image, principal distance and said known distances.

15. A method of measuring distance including vertical height comprising:

a. measuring the absolute three dimensional location of points D, E and F with respect to a coordinate system defined using three points, A, B and C, separated by known distances using image data by:

a1. capturing two images of a scene containing the points A, B, C, D, E and F, using one or more cameras of known principal distance, a2. determining the location and orientation of said one or more cameras at the time each of said images was captured with reference to said coordinate system using points A, B, and C from said images, principal distance and said known distances, a3. using the locations of the one or more cameras at the time the images were captured to determine the locations of said points D, E and F from image data, b. determining distances between points D, E and F, and c. using the location of said points D, E and F and the location of one or more cameras at the time images were captured to determine the location of other points.

16. The method of claim 15 in which the locations of points D, E and F are used to determine the location of said other points using image data from images different from those used to determine the location of points D, E and F.

17. Apparatus for measuring the absolute three dimensional location of a point D with respect to a coordinate system defined using three points, A, B and C, separated by known distances using image data comprising:

a. one or more cameras for capturing images of a scene containing the points A, B, C and D, b. means for storing images captured by said one or more cameras, c. means for processing stored images to determine the location and orientation of said one or more cameras at the time each of said images was captured with reference to said coordinate system, using 3 to 5 points from said images, principal distance and said known distances, d. means for using the locations of said one or more cameras at the time the images were captured to determine the location of said point D from image data.

18. Apparatus as claimed in claim 17 in which the location of point D is stored in a database utilized to store a three dimensional wireframe representation.

19. Apparatus as claimed in claim 18 in which the location of point D is stored in a database of locations of points surveyed.

* * * * *